C. M. ALEXANDER.
MANUFACTURE OF MOTOR FUEL.
APPLICATION FILED NOV. 30, 1917.
1,407,619.
Patented Feb. 21, 1922.
5 SHEETS—SHEET 2.
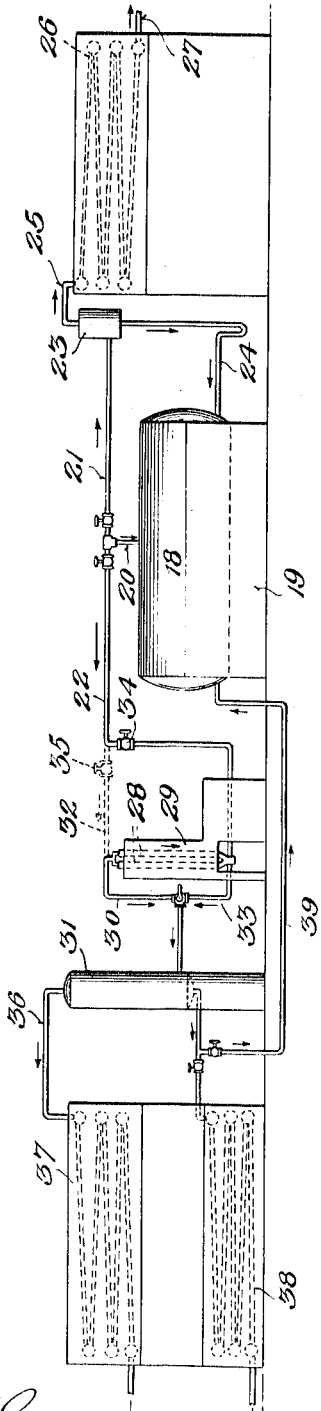
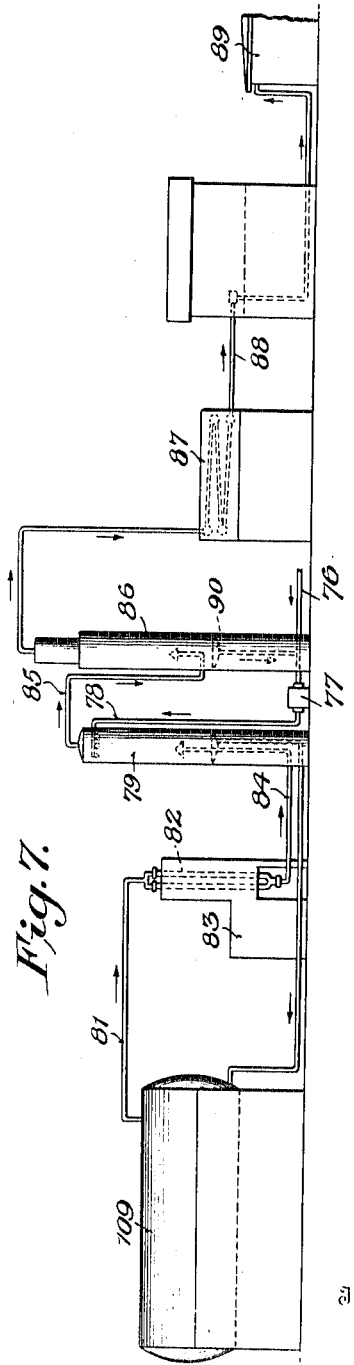

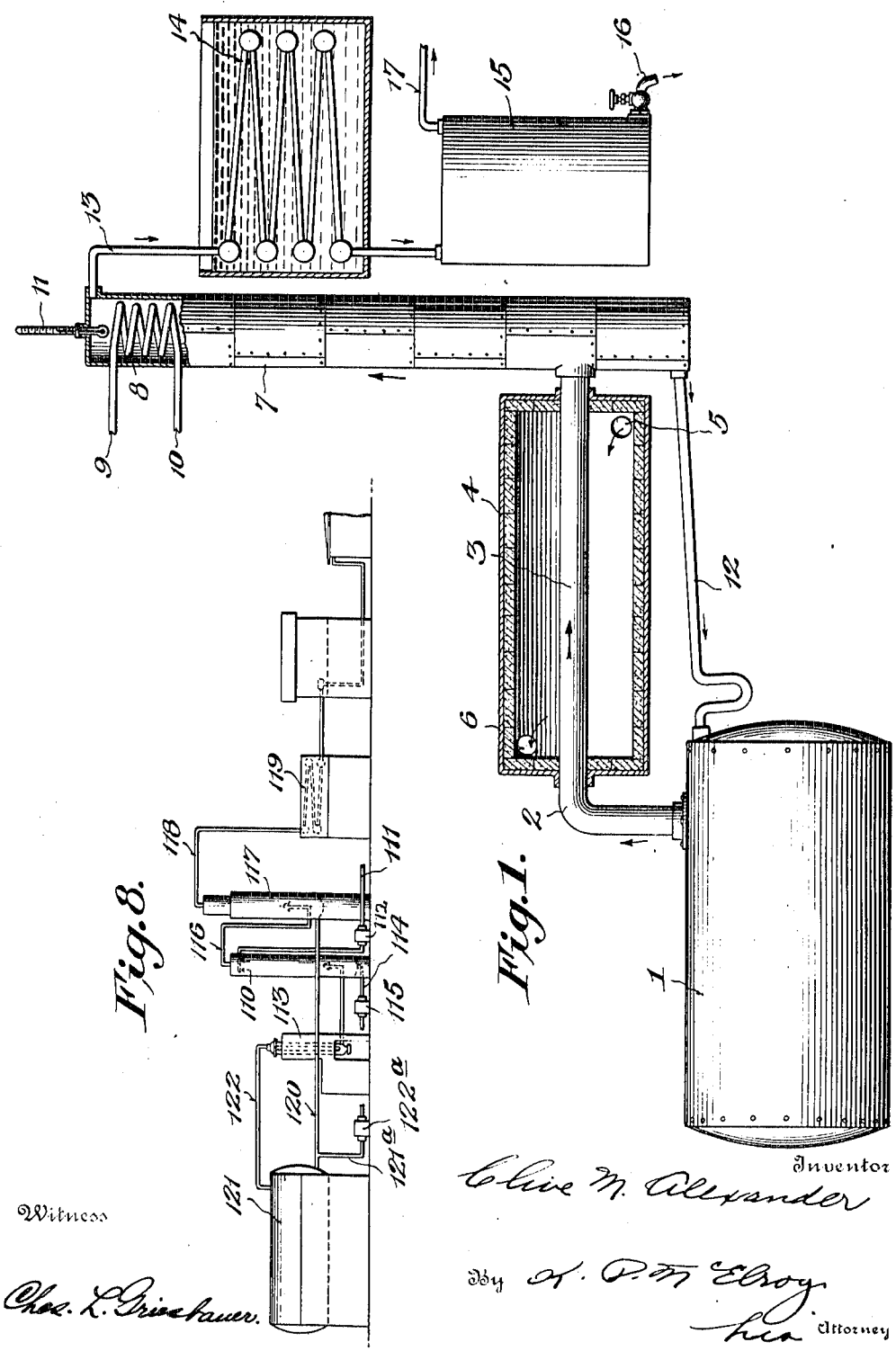

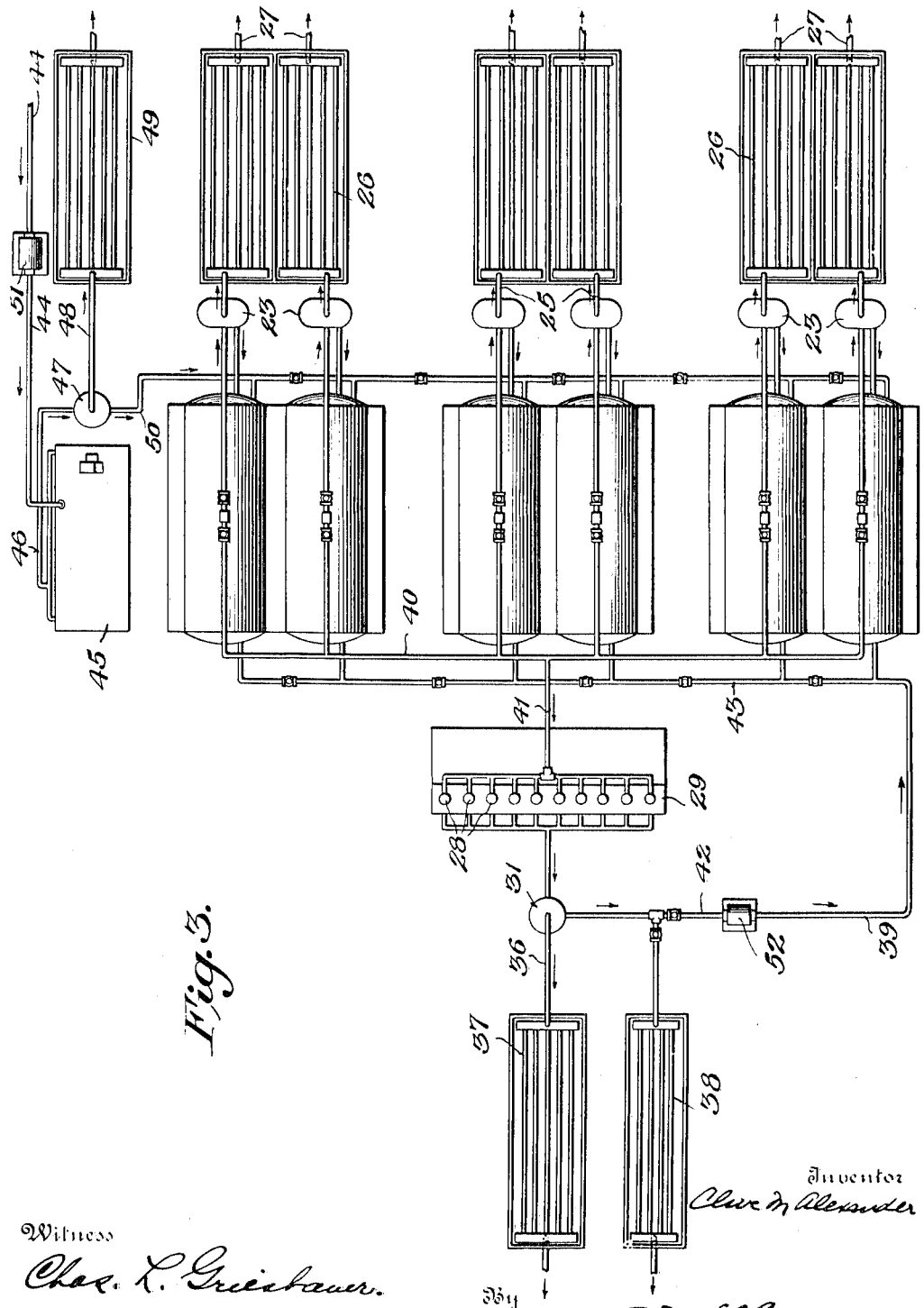

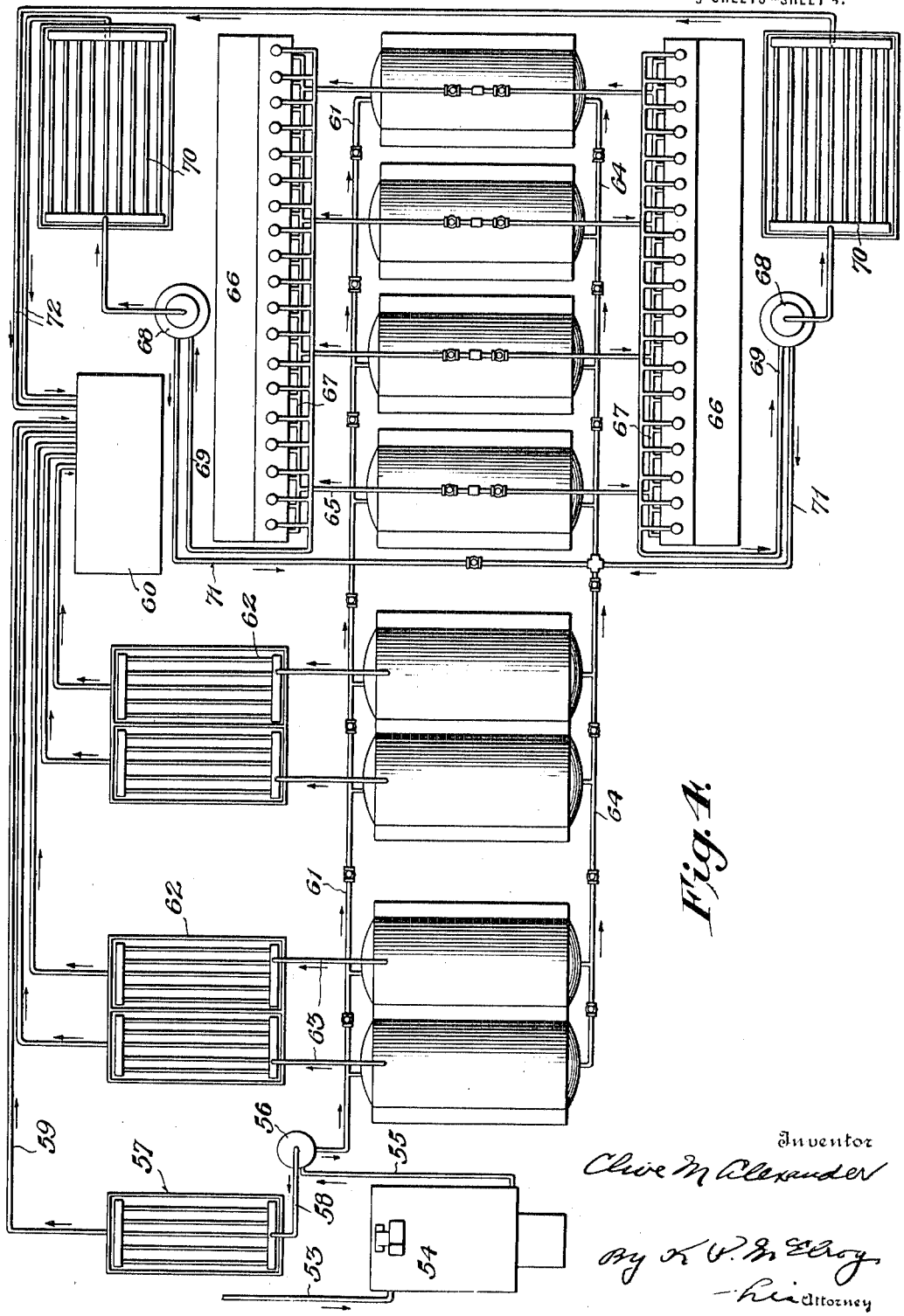

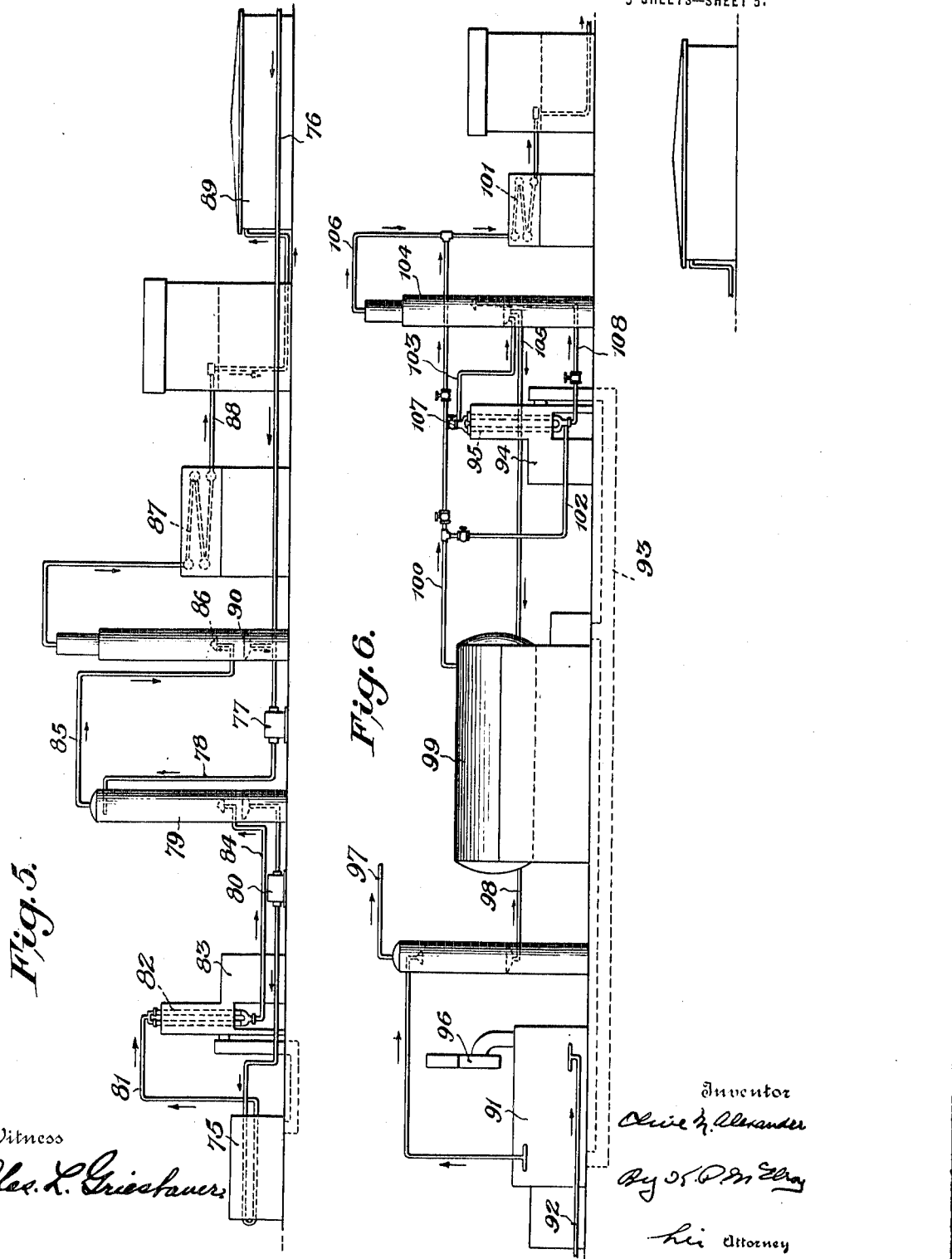

UNITED STATES PATENT OFFICE.

CLIVE M. ALEXANDER, OF PORT ARTHUR, TEXAS, ASSIGNOR TO GULF REFINING COMPANY, OF PITTSBURGH, PENNSYLVANIA, A CORPORATION OF TEXAS.

MANUFACTURE OF MOTOR FUEL.

1,407,619.  Specification of Letters Patent.  Patented Feb. 21, 1922.

Application filed November 30, 1917. Serial No. 204,635.

*To all whom it may concern:*

Be it known that I, CLIVE M. ALEXANDER, a citizen of the United States, residing at Port Arthur, in the county of Jefferson and State of Texas, have invented certain new and useful Improvements in Manufacture of Motor Fuels, of which the following is a specification.

This invention relates to the manufacture of motor fuels; and it comprises a method of making motor fuels of the nature of gasoline and containing large proportions of readily volatile, readily ignitable hydrocarbons from petroleum materials of higher initial boiling point, (such as crude petroleums and petroleum residue and distillates such as gas oil, solar oil, kerosene), by cracking such higher boiling oils with the aid of heat wherein the higher boiling oils are vaporized (with or without cracking according to the nature of the oil) and the vapors are passed through a tubular cracking zone, the temperature of such zone, its length and the volume of vapors passed through such zone being so correlated that only a partial cracking occurs therein and much of the vapors so passed emerges uncracked, the general rule being to carry the cracking only so far that at least 40 or 70 per cent of oil of as high boiling point as the initial oil can be, and is, recovered;—the high boiling oil so recovered being, if desired, returned to the still or other source of vapors; and it more particularly comprises a method of making motor fuels in the distillation of petroleum materials, such as crude oil, wherein such materials are distilled down in stages in a still provided with the usual air cooled tower or dephlegmator (which may be arranged to drain back to the still) and with the usual positively cooled condensers beyond, the vapors in one stage of the operation being sent directly to said plurality of condensers and at another stage being sent thither through a cracking tube or retort; all as more fully hereinafter set forth and as claimed.

In view of the extended use of gasoline engines many efforts have been made to develop new sources of motor fuel adapted for use in internal combustion engines. Many mixtures of various combustible liquids have been proposed as gasoline substitutes and many methods have been suggested, and to some extent are in use, for increasing the yield of "gasoline" from petroleum. Most of the substitutes and most of the products of these methods, are not wholly composed of easily volatile oils or substances. With the usual types of carburetors, it is only necessary that some portion of the composition be readily volatile to facilitate quick ignition. The lighter the specific gravity of a petroleum oil, the lower is its boiling point and the greater its volatility; and, vice versa, the heavier an oil, the higher is its boiling point and the less its volatility. For this reason it is customary to buy and sell gasoline on the specific gravity (Baumé degrees) since the lighter an oil is the greater is its volatility and the better it is adapted as a motor fuel. The Baumé degree alone however is not a sufficient index to the nature of an oil since obviously a mixture of rather heavy oils and rather light oils may have an average specific gravity the same as that of a distillate mainly composed of oils of medium specific gravity. For this reason, as a further characterization there is sometimes used the "end dry point"—the temperature at which the final residues of a given sample will all boil away. This indicates the character of the heavier constituents of a given gasoline or motor fuel.

All natural petroleums are mixtures of relatively heavier and relatively lighter oils; and most varieties of crude oil will give upon distillation some proportion of light oils which upon condensation can be sold as gasoline. The character of this gasoline as regards specific gravity and end dry point of course depends upon the crude oil and the circumstances of distillation; upon the amount of less volatile oils going over and collected with the more volatile oils. This natural gasoline is known as refinery gasoline.

It is a very old proposition to obtain in addition to this refinery or natural gasoline a further proportion of "cracked gasoline" produced by breaking down the heavy hydrocarbons by heat; and many ways of effecting this breaking down have been proposed. A number of these are in practical use. Any heavy oil will break down into lighter products when heated to a sufficient temperature for a sufficient time; whether the heating be of the liquid oil or of its vapors. The degree to which it breaks down depends altogether on circumstances; breaking down may go so far as to give permanent gases (oil gas) as the main product or it may go only so far as to produce gasoline, or even kerosene. Most of these prior methods have failed in producing the best results, i. e., the production of a maximum amount of oils sufficiently light and volatile to be salable as gasoline. This was for the reason that the treatment was too far-going and too drastic; the effort was to produce the maximum possible amount of cracking in a given treatment. To this end, liquid oil has been superheated under pressure sufficient to keep it liquid; oil has been sprayed into very hot chambers under very high pressure; oil and oil vapors have been run over red hot catalysts; etc. These processes all produce gasoline; but they do not give high yields; there is too much decomposition of oil into gas and coke and tar.

I have found that better results can be obtained by a more moderate treatment; that it is much better not to try to do too much cracking in an operation but to leave a substantial proportion or even a major fraction of the oil unacted on. In so doing this oil acts as a shielding agent as regards the cracked products, preventing the conversion going too far. And in order that I may obtain a uniform heating and uniform action I find it is better to do the heating with the oil in a vaporized condition. The vapor I use as dry as possible, that is as free as possible of droplets or suspended portions of liquid oil. This is for the reason that the heat of vaporization of oil is quite high and in the presence of liquid oil in the cracking zone heating conditions are apt to become irregular because of the absorption of heat in vaporization; I cannot get the uniform temperature conditions throughout the mass of vapor that I strive to attain. For this reason I find it best to work with a "dry" vapor. Since as I find the matter of cracking is simply that of getting the hydrocarbon up to the right temperature and as pressure and other complications are of little or no use, I operate at about atmospheric pressure; using no more pressure in any event than is necessary to produce movement of my vapors. It is even better not to use this much pressure, or indeed to use a slight degree of vacuum since the vapors can be moved by suction as readily as by pressure and a slight degree of vacuum promotes the volatilization of any liquid oil that may be present. A little steam, up to a per cent or so, has about the same effect as the use of a slight vacuum. The use of any greater proportion of steam is not worth while and is disadvantageous because it lessens the capacity of the apparatus. It seems to have no particular influence on the cracking operation, otherwise, one way or the other. The use of catalysts is unnecessary.

By producing only a limited cracking of oil vapors at about the ordinary pressure, the operation becomes so positive that changes in conditions do not much affect the result. There is therefore no use for the complications and refinements of the prior cracking methods. As a cracking zone I ordinarily use an iron or steel tube of, say, 6 or 8 inches internal diameter which may be vertical with upward or downward flow of vapors or may be horizontal or inclined. The interior of this tube is open and unobstructed. Any ordinary heating means may be employed such as gas firing, coke firing, etc. One or more tubes may be used in a single heating chamber. No rigid control of temperature in the heating means is necessary since whatever the temperature of the iron or steel tube, as long as it is high enough, the temperature within will be governed by the amount or volume of vapors sent through. In order to produce any given average temperature of the vapors passing through the tube, the volume so transmitted may be varied. The temperature of the iron tube or the furnace chamber surrounding it may range between 450 and 700° C. (842–1292° F.) without affecting the operation. The higher the temperature the more vapor must be sent through per minute and vice versa. A temperature of 500° C. (932° F.) in the furnace chamber works well.

The conditions of operation are governed more by observation of the character of the vapors passing beyond the cracking zone than by any control of the temperature of the furnace chamber. The object is, in all cases, to effect only a partial cracking of the vapors in a single passage. Ordinarily I control conditions so that on cooling the vapors a condensate will be obtained of which at least 40 to 70 per cent (calculated on the oil used to furnish the vapors) is as high boiling as the oil used to furnish the vapors. In other words, ordinarily I only about half crack, so to speak.

The vapors supplied to the cracking zone may be those of any oil higher boiling and heavier than gasoline. Naturally, the lower boiling the oil used the easier it is to convert it into gasoline with a large yield; kerosene, for example, being easier to crack down into gasoline than is gas oil or solar oil. Kerosene can be vaporized without much cracking in the vaporization and the same is true of many gas oils and solar oils. Other oils of heavier nature generally crack down to some extent in being converted into vapors and the vapors are therefore of oils lighter than those which are distilled. Therefore in speaking of the recovery of a condensate of which 40 to 70 per cent will be as high boiling as the original oil, I wish it to be understood that I mean the 40 to 70 per cent of high boiling oil recovered will be as high boiling as the oil that could be produced by condensing the vapors entering the cracking zone. This is for the stated reason that sometimes the oils which I use to produce the vapors crack down in the vaporization and the vapors are therefore of oils lighter than those charged to the vaporizer.

As stated, cracking always occurs when hydrocarbons are heated, heavier and higher-boiling oils being converted into lighter and lower boiling products; this change occurring whether the hydrocarbons be heated as vapors or as liquids. For practical purposes, in so far as the type of cracking here interesting is concerned, the influence of pressure is negligible and any degree of pressure greater than atmospheric is undesirable; and particularly any degree which would tend to restrain vaporization of liquid hydrocarbons. The degree of temperature attained by the hydrocarbon is a much more important factor; but in the present invention this factor is automatically controlled by the simple expedient of always keeping an excess of oil vapors in the cracking zone. Cracking probably takes place at all high temperatures to some extent; but this extent is not important, with most oils, below about 600° F. and does not become energetic below, say, 700° F. At a range between 1100° and 1300° F., it is energetic and far-going, tending to resolve all oils into permanent hydrocarbon gases; while at temperatures still higher, these gases in turn break down. Between 600° and 700° F. all the petroleum oils vaporize or yield vapors (by cracking) while in this temperature range all the products here sought are vapors. In attaining temperatures over 600° F. and in cracking, heat of course must be furnished; but most of this heat is that required for vaporization (or vaporization with cracking), the amount required for the cracking of the vapors being, comparatively, little. For this reason in an embodiment of the present process wherein vapors are taken directly from a still in the course of the ordinary distillation represents an important economy of heat, it being then necessary only to furnish the slight amount of heat required for cracking. With the use of substantially dry vapors, that is vapors free from any substantial amount of liquid, it is easier to furnish a controllable degree of heat since it is not then necessary to allow additional heat for vaporization. This desirability of dry vapors in the cracking operation is one of the reasons for not using pressure, the influence of pressure being, of course, to restrain or prevent vaporization or to reliquefy vapors.

Since I am merely passing oil vapors through a hot tube and thence to a condenser without the use of complicated apparatus or processes my method lends itself readily to intercalation or interposition iln the ordinary methods of oil distillation as practiced in this country. For example, in distilling a crude oil the vapors from the still may be sent directly to the ordinary air-cooled condensing or dephlegmating tower and thence to water cooled condensers as long as the natural gasoline and burning oils are coming over and then at this time be by-passed through the cracking tube, the vapors coming from the cracking tube being then sent to the succession of condensers stated. The oil coming from the tower may be drained back directly into the still. Or the transmission of vapors directly to the tower and condenser may be interrupted at the time when the natural gasoline has come over and the following vapors of burning oil may be by-passed via the cracking tube on their way to the condensers. By provision of a cracking tube on a by-pass conduit between the still and the condensers the cracking operation may be used at any stage in the ordinary distilling processes.

I ordinarily use a succession of condensers of two different types. The first condenser, which may be air cooled or water cooled as the case may be, I maintain at a high temperature; a temperature such that high boiling oils passing through the cracking zone will be here condensed but without much condensation of gasoline. The second condenser is the ordinary water cooled type adapted to condense gasoline. The temperature at which the first condenser is to be used will of course depend upon the nature of the oil being cracked; it being maintained at a much lower temperature when kerosene is the oil undergoing the cracking than when a higher boiling oil is treated. Ordinarily, I use a common type of dephlegmator for the first condenser. In the case of high boiling oils particularly, air cooling may be sufficient; but if necessary, as is often the case in cracking kerosene, I may also water-cool. The material delivered by the second condenser is applicable for use as a motor fuel. Ordinarily its amount added to the amount of condensate in the first condenser should be at least 90 per cent of the total amount of oil vaporized; that is there should not be as much as 10 per cent disappearing as gas, tar and coke. The amount of condensate produced in the final condenser can of course be varied by control of conditions in the primary condenser. Ordinarily with 50 per cent of the oil recovered in the primary condenser the gasoline coming from the final condenser will have an end dry point under 400° F. With 40 per cent recovery in the primary condenser the end dry point of the gasoline will be 430° F., while in producing the gasoline of an end dry point of 450° F. there may be only 30 per cent recovered in the air cooled condenser.

The oil recovered in the primary condenser may be sent directly back to the still or vaporizing device and ordinarily is so sent.

A further portion of light gasoline may be obtained by scrubbing the gases passing beyond the final condenser with the aid of a little heavy oil. The gasoline is absorbed by the heavy oil and may be regained by distilling it off, the exhausted wash oil being then sent back for reuse. Or, the oil which is to be sent to the vaporizing device for furnishing vapors to pass through the cracking tube may be used in this scrubbing operation, being sent through the scrubbing device to recover gasoline vapors and being then sent directly to the still.

In producing very light, easily volatile gasolines for aeroplane engines, dry cleaning clothes, etc., it is a useful expedient to scrub in the primary condenser as well. The vapors in this condenser are hot and on contact with a little scrubbing oil they give up to it only high-boiling bodies. Where the condensate from the primary condenser is sent back to the still (as it may be), the scrubbing oil used therein may be the fresh oil to be supplied to the still.

In the accompanying illustration I have shown, more or less diagrammatically, apparatus adapted for use in the described process.

Figure 1 is an elevation partly in section of a simple type of apparatus;

Figure 2 is a similar view of an apparatus enabling utilization of the present process in distillation at any stage of such distillation;

Figure 3 is a top plan view of the apparatus similar to that shown in Figure 2 wherein a plurality of units is employed;

Figure 4 is a top plan view of another form of apparatus in which continuously operating batch stills are used with means for diverting vapors at any desired time to a cracking apparatus under the present invention;

Figure 5 is a diagrammatic elevation of an apparatus wherein oil to be vaporized is used for scrubbing in a primary condenser; and wherein two primary condensers in series are employed;

Figure 6 is a similar view illustrating means for feeding the vapors either to the top or the bottom of the cracker; and Figure 7 is a modified type of apparatus similar to that of Figure 5.

Figure 8 is still another type of apparatus which may be employed in performing this process.

Referring to the drawings, element 1 indicates conventionally a petroleum still of any well known or suitable type, provided with vapor exit 2 in communication with the cracking tube 3 (here shown as horizontal or slightly inclined) passing through and surrounded by a suitable heating jacket 4 by the aid of which such cracking tube may be maintained at any temperature desired, such as a red heat. Any suitable firing means may be employed for this heating chamber; and there are diagrammatically shown inlet 5 for flame and flame gases and outlet 6 for products of combustion. The cracking tube 2 is in communication with a primary condenser 7 at or near the bottom. As shown, this primary condenser is of an ordinary air cooled type. In treating high boiling oils with a primary condenser of sufficient surface, additional means of cooling may not be necessary. If additional cooling is desired, it may be furnished as by the cooling coil 8 in which water is admitted at 9 and discharged at 10. As shown, temperatures at the top of the tower may be read by the aid of thermometer 11. The vapors of high boiling oils passing through the cracking zone unchanged are condensed in this column and, as shown, are returned to the still while hot by trap conduit 12 for revaporization. Uncondensed vapors leave the top of the tower through conduit 13 and go thence to a final condenser 14; here shown as of a simple water cooled type. Condensed liquids flow to receiving tank 15 whence they may be removed at outlet 16. Uncondensed gases may be led to a scrubber or point of use through 17.

In Figure 2 is shown a more complicated structure in which vapors coming from a still may be sent either to a cracking device or directly to a condenser, which in this case has the same function as the final condenser of the figure just described. The structure is useful in a method of distilling crude oil wherein first gasoline and kerosene naturally contained are directly distilled and removed and thereafter vapors are sent through a cracking tube. In this showing element 18 is a conventionally shown petroleum still having firing chamber 19. From the top of the still passes vapor conduit 20 connecting with two valved pipes, respectively, 21 and 22. Conduit 21 leads to a simple reflux condenser 23 having a trap return 24 leading back to the still. From the top of this reflux condenser uncondensed vapors pass through pipe 25 to an ordinary water cooled condensing device 26. Condensed gasoline or kerosene is removed at 27. The other vapor conduit (22) leads directly to a cracking device. As shown the vapors enter at the bottom of a heated vertical cracking tube 28 and pass upward therethrough. Surrounding the cracking conduit is a furnace chamber 29. The vapors of cracked products mixed with vapors of uncracked oil pass off at the top of the cracking tube through pipe 30 and thence to primary condenser 31. There are some advantages in passing the vapors upwardly through a vertical cracking tube but they may of course be passed downwardly if desired. To this end, there may be provided an alternative conduit 32 leading the vapors to the top of the cracking conduit. Cracked and uncracked vapors may then be removed from the bottom of the cracking tube through 33 and go thence to the primary condenser. Passage of vapors through these conduits may be controlled, respectively, by valves 34 and 35. From the primary condenser uncondensed vapors (gasoline or motor fuel) pass through conduit 36 to a water cooled final condenser 37 while condensed products pass from the bottom of the primary condenser through the cooling box 38. If desired, instead of sending the condensate from the primary condenser through the cooling box for such disposition as may seem proper, the hot liquor from the bottom of the primary condenser may be returned directly to the still by means of valved conduit 39.

In Figure 3 the elements similar to those of Figure 2 have the same reference numerals. This figure illustrates a plurality of stills such as that of Figure 2, all capable of supplying vapors to a common cracking device. To this end, the vapor outlet which in Figure 2 leads directly to a cracking device here communicates with a cross pipe 40 which in turn has connection through 41 with a battery of cracking tubes similar to the cracking tube of Figure 2. The battery of cracking tubes in turn communicates with primary and final condensers in the same manner as in Figure 2. The condensate from the primary condensers may be delivered through pipe 42 and cross pipe 43 to any of the stills. As in Figure 2, each of the stills is provided with a directly connected condenser (final condenser). By this arrangement, presuming the plurality of stills are operating out of phase, one or more of the stills may always be furnishing vapors for cracking to the cracking tube while other stills are performing preliminary distillation; the removal of the natural gasoline and kerosene of the crude oil. The oil may be supplied to the plurality of stills through the inlet pipe 44 leading to a preheater 45, from which any light vapors are passed through pipe 46 to a dephlegmating tower 47 and thence through pipe 48 to a condenser or cooler 49. Liquid oil leaves the base of the diphlegmating column 47 and is conducted to any one of the plurality of stills through the valved line 50. Pump 51 may be provided for delivering the oil through the preheater to the stills and pump 52 may be provided for returning to the stills hot heavy oils which are not passed to the cooling box 38.

In the apparatus of Figure 4 a description of the operation will suffice to identify the different elements. The oil enters through pipe 53 to a preheater 54 whence it is conducted by line 55 to the dephlegmator 56, the vapors therefrom being sent to a condenser 57 through pipe 58 and from such condenser as liquids through pipe 59 to the receiving means 60. The heated liquid from the dephlegmating column 56 is fed by means 61 to any one of a plurality of stills operating in parallel or in series. Ordinary distillation takes place in these stills, the kerosene, gasoline or other light vapors being conducted to condensers 62 by means of the pipes 63. After the preliminary distillation in these stills the heavy oils are conducted by pipe 64 to a plurality of cracking stills (four being shown) which may be run in series or parallel. The vapors from these stills are conducted by means of pipes 65 to crackers 66, being delivered into one of the set of cracking tubes therein by means of the mains 67. The cracked vapors pass to the preliminary condensers 68 through pipes 69 and from there to the final condensers 70. The heavy oils from the preliminary condensers 68 pass through tubes 71 back to the coking stills. The condensed final product from condensers 70 is delivered by means of pipes 72 to the receiving means 60.

In the apparatus shown in Figure 5 instead of an ordinary still there is disclosed a vaporizing device 75 to which the desired oil is fed by means of a main 76. This main leads to pump 77 which delivers the oil through pipe 78 to the top of an interchanger 79, the oil therein contacting with the vapors from the cracker as hereinafter described. After such contact the oil is forced by means of pump 80 to the vaporizer which may be heated in any known manner. From the vaporizer the vapors pass by means of pipe 81 to the top of the cracker 82 having heating chamber 83 and from the cracker the cracked products pass by means of the conduit 84 to the bottom of the heat interchanger shown where they are scrubbed by the incoming oil as just described. From the top of the heat interchanger these cracked scrubbed products may be passed by means of the line 85 to the bottom of a primary condenser 86 whence uncondensed vapors pass to the final condenser 87 and thence by means of line 88 to a storage tank 89. The condensed products in the primary condenser 86 are collected in 90 and join the crude or raw oil which is being delivered to the vaporizer 75.

In the apparatus shown in Figure 6 the crude oil is fed to a dehydrator and preheater 91 by means of the main 92. The dehydrator and preheater is furnished with hot gases from the flue 93 leading from the chamber 94 of the cracker 95 and these gases are exhausted from the preheater by means of the fan 96. The oil is fed to the dehydrator and preheater under pump pressure and is delivered to the top of the dephlegmating column where the steam is flashed out and conducted away through pipe 97. From this tube the dehydrated oil is fed by means of pipe 98 to the still 99. The oil in this still may be given the usual preliminary treatment to produce gasoline, kerosene and other light oils if desired, in which event they are passed through pipe 100 directly to the final condenser 101. In event that it is desired to crack any one of these light oils or the vapors from the heavier oils after removal of the light oils, they may be passed to the bottom of the cracker 95 by means of the pipe 102. The cracked products may pass from the top of the cracker through pipe 103 to the bottom of the primary condenser 104, condensates therefrom being returned to the still through pipe 105. The vapors from the primary condenser may pass to the secondary condenser through the passage 106. In event it is desirable to pass the product from still 99 to the top of the cracker, this may be done through line 100 connected to the cracker at 107. In this event the vapors are delivered from the cracker through pipe 108 to the primary condenser. It is obvious that the vapors may be passed directly to the primary condenser or to the bottom or the top of the cracker by proper manipulation of the valves in the line.

Figure 7 shows an apparatus quite similar to that of Figure 5, except that a still 109 is used in the place of the vaporizer 75 shown in Figure 5. The same elements designate corresponding parts and the operation is the same.

In Figure 8 of the drawings I have shown an apparatus particularly applicable for use in the present process wherein crude oil is stripped by the aid of the cracked vapors, this oil being fed to the exchange tower 110 through pipe 111, by means of pump 112. Heat exchange and evaporation and condensation take place in the exchange tower, certain products such as gasolines, kerosenes, solar oils and gas oils being vaporized by the vapors from the cracking tube 113. The heavy fractions or residuum of the crude oil together with the heavy oils condensed from the cracked vapors, pass out of the bottom of the exchange tower through line 114 to a storage tank, (not shown). Pump 115 is used to pump the heavy oils to the storage tank. The lighter oils vaporized in the exchange tower together with uncondensed vapors from the cracking tube are conveyed from the top of the tower through pipe 116 to the fractionating tower 117. Fractionating is accomplished in the fractionating tower by air, water or oil cooling and the cooling of the tower is so arranged that only the desired motor fuel remains uncondensed. The uncondensed vapors from the fractionating tower are conveyed through pipe 118 to a final condenser 119 and thence to the receiving house. The vapors condensed in the fractionating tower are conveyed by pipe 120 to vaporizer or still 121 where they are again vaporized. Under usual conditions it is necessary to supply an additional quantity of oil to the vaporizer or still. Pipe 121ª is used to feed the additional fresh supply of oil. This pipe leads to a source of suitable material. Pump 122ª is used to feed this oil to the still. The vapors from the still are conveyed through pipe line 122 to the cracking tube or tubes and thence through the system in the manner similar to that described in connection with the apparatus shown in Figure 5 of the drawings. The advantages of the apparatus shown in Figure 8, when employed in connection with crude oil are that such oil may be stripped of its lighter constituents by the heat of the vapors from the cracking apparatus thereby economizing heat. The heavy stripped oil removed from the fractionating tower through pipe 114 may be utilized in any suitable way. The vaporizer shown in this view is a still similar to still 109 shown in Figure 7 but under some circumstances I may employ in lieu thereof such a special vaporizer as the element 75 of Figure 5.

In all the views valves are provided on the lines permitting control of amounts and direction of flow of oil and vapors. This operation is obvious from the above description.

The yield obtained in the several condensers of course depends largely upon the character of the oil under treatment, greater yields of motor fuel being of course obtainable from kerosene than from heavier oils, such as gas oil and solar oil. With solar oil and gas oil, ordinarily there will be condensed in the primary condenser 70 per cent or so of high boiling oil where gasoline of 400° F. dry point is being made; or about 60 per cent in making a gasoline of 430° dry point. In speaking of these gasolines, I of course mean the refined products obtained by steam treating and stilling the secondary condensates. In the rectification of gasoline in the steam still, a small amount of "heavy ends" is always obtained.

What I claim is:—

1. In the manufacture of low boiling oils from higher boiling oils, the process which comprises vaporizing such a higher boiling oil, passing the vapors through a hot tubular cracking zone at such a rate that only a portion of the vapors are cracked therein, passing the emerging vapors through an air cooled condenser and in such a condenser scrubbing with high boiling oil, returning the mixture of scrubbing oil and condensed high boiling oil to serve for the production of vapors for the cracking zone, and condensing the residual vapors passing the air cooled condenser to give a condensate of the desired low boiling oils.

2. The process of converting high boiling petroleum hydrocarbons into low boiling petroleum hydrocarbons which comprises passing the vapors of high boiling petroleum hydrocarbon oils through a heated zone at a temperature of about 500° C. and at a rate sufficiently rapid to give a condensate having at least 80 per cent volume of the original oil and containing a substantial proportion of oils as high boiling as those so passed.

3. In the process of making low boiling petroleum hydrocarbons, such as gasoline, benzine, ligroin, and the like from high boiling petroleum hydrocarbons, such as crude petroleum, petroleum distillates, and petroleum residuums, the process which comprises passing the vapors of such high boiling oils through a heated zone at a temperature of about 500° C. at about atmospheric pressure, and at a rate sufficiently rapid to ensure a substantial portion of such vapors passing through unchanged, fractionally condensing the so treated vapors in such manner that the high boiling and unchanged hydrocarbon products are separated from the desired low boiling hydrocarbon product, and continuously returning the high boiling and unchanged hydrocarbon products to be rerun repeatedly through the same cycle of treatment.

In testimony whereof I have hereunto affixed my signature this 23 day of November, 1917.

CLIVE M. ALEXANDER.